Sept. 30, 1958  J. J. PARKER ET AL  2,854,240
RADIAL JAW CHUCK

Filed March 13, 1957  3 Sheets-Sheet 1

INVENTORS
JOHN J. PARKER & LONDON T. MORAWSKI
BY
ATTORNEYS.

Sept. 30, 1958　　　J. J. PARKER ET AL　　　2,854,240
RADIAL JAW CHUCK
Filed March 13, 1957　　　　　　　　　　3 Sheets-Sheet 2
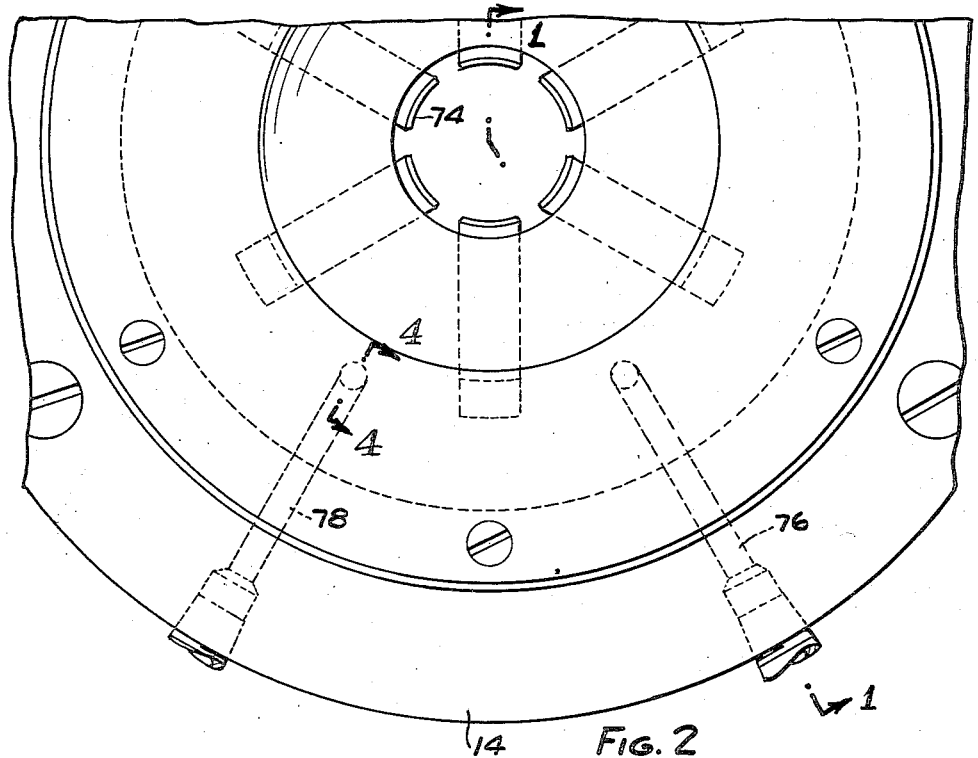
FIG. 2
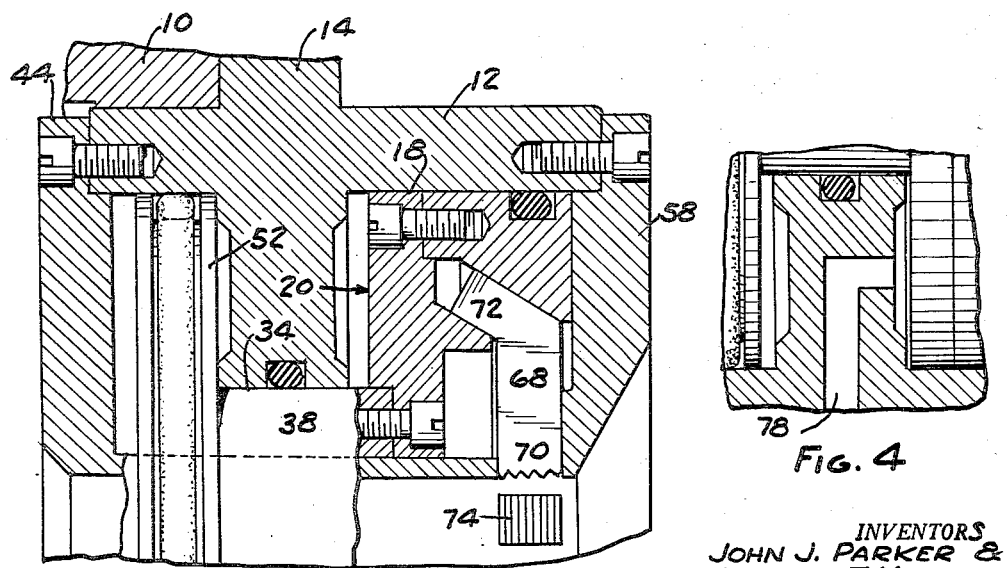
FIG. 3
FIG. 4
INVENTORS
JOHN J. PARKER &
LONDON T. MORAWSKI
BY
Barnes, Kisselle, Laughlin & Raisch
ATTORNEYS Sept. 30, 1958   J. J. PARKER ET AL   2,854,240
RADIAL JAW CHUCK
Filed March 13, 1957   3 Sheets-Sheet 3

INVENTORS
JOHN J. PARKER & LONDON T. MORAWSKI
BY
ATTORNEYS

United States Patent Office 2,854,240
Patented Sept. 30, 1958

2,854,240

RADIAL JAW CHUCK

John J. Parker and London T. Morawski, Detroit, Mich.

Application March 13, 1957, Serial No. 645,703

3 Claims. (Cl. 279—121)

This invention relates to chucks for holding work pieces and is more particularly concerned with a chuck of the class having two or more radially movable jaws for engaging a work piece.

In the production of machined parts in large quantities where special tooling is economically feasible, it is frequently desirable to provide a work holding means which has jaws custom fitted to the particular work piece which is to be held. For this class of service, conventional chucks are cumbersome and costly, particularly when a changeover of the custom fitted jaws to a different part is required.

It is an object of the present invention to provide an improved chuck wherein custom fitted jaws may be utilized and in which the jaws may be quickly and easily removed and a different set substituted without requiring extensive dismantling of the chuck.

A further object is to provide a chuck of this nature wherein a longitudinal slideably actuator is provided with jaw engaging cams which co-operate with radially movable jaws for clamping work pieces.

Another object of the present invention is to provide a chuck of this character in which the chuck actuating member is provided with a jaw-guiding surface arranged along the elements of a cone for the purpose of producing radial motion of work engaging jaws.

Further objects and advantages of the present invention will be apparent from the following description, reference being made to the accompanying drawing wherein a preferred form of the present invention is illustrated.

In the drawings:

Fig. 2 is an end view of the chuck mechanism shown in Fig. 1.

Fig. 3 is a fragmentary section corresponding to Fig. 1, showing the parts in disengaged position.

Fig. 4 is a fragmentary cross section on line 4—4 of Fig. 2.

Figure 1:
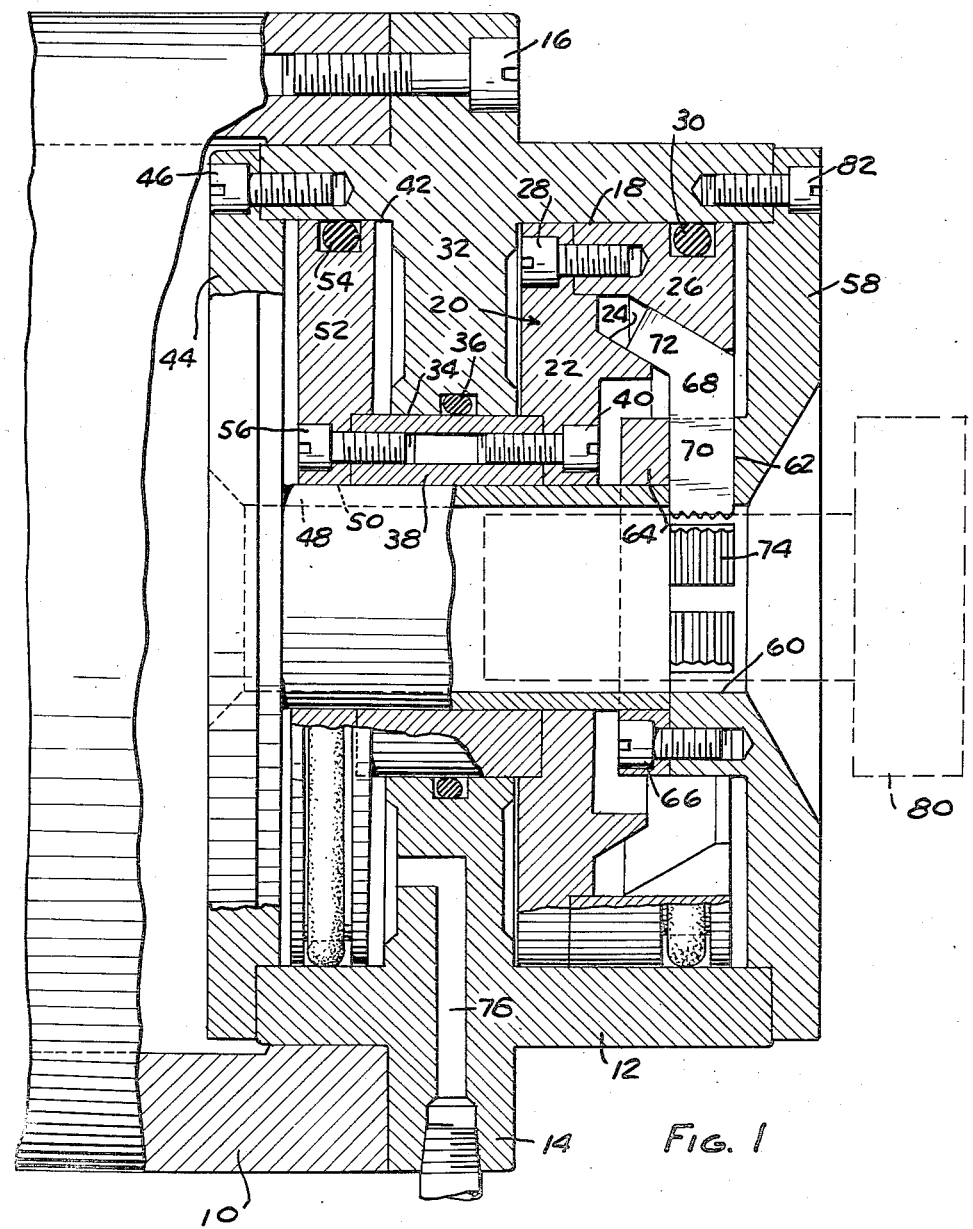
Fig. 1 is a longitudinal section of a chuck mechanism embodying a preferred form of the present invention.
Figure 5:
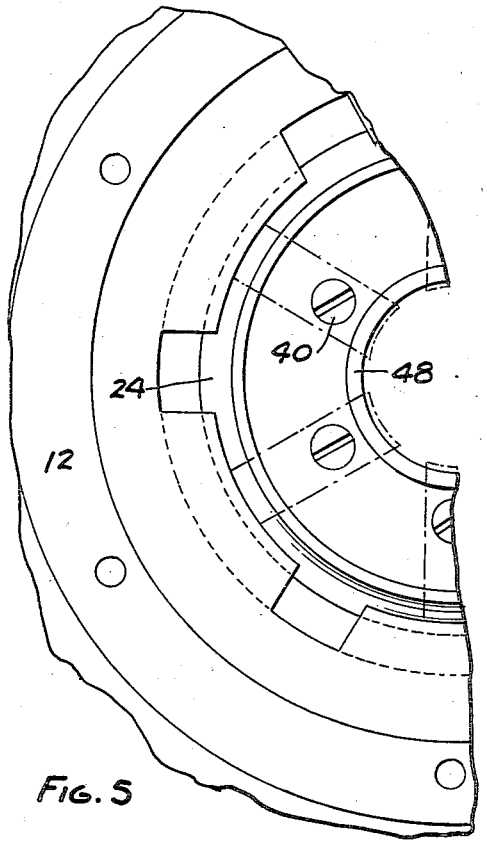
Fig. 5 is a fragmentary end view of the chuck with the nose piece removed.
Figure 6:
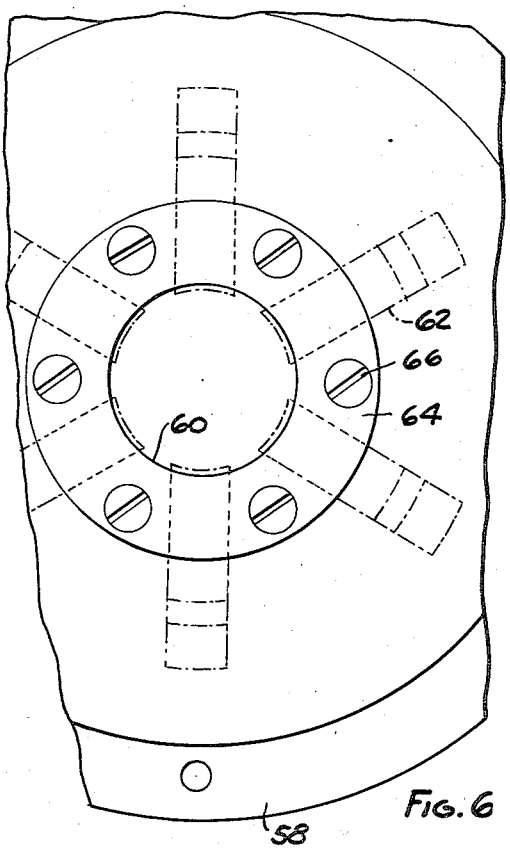
Fig. 6 is a fragmentary view of the inner face of the nose piece.

Figs. 8 through 12 are fragmentary views of alternative forms of chuck jaws as they would appear when viewed from the end of the chuck. Referring now to Fig. 1, there is provided a chuck support 10 which in the present form is stationary although it may be rotatable or reciprocable. Secured to the end face of this support 10 is a chuck body 12 having a flange 14 secured to the support by cap screws 16. The body 12 is provided with an inner cylindrical chamber 18 which is open to the right hand end of the body in Fig. 1. Slideably positioned within the chamber 18 is an actuator generally designated as 20.

The actuator 20 comprises a base ring 22 which has formed upon it a plurality of jaw-guiding surfaces 24, arranged along the elements of an imaginary cone. A second ring element 26 is secured to the ring 22 by cap screws 28 and serves to enclose the jaw receiving recesses 24. The ring 26 has a packing at 30 so that the actuator 20 may serve as a piston operable by fluid pressure applied upon the left hand face thereon.

The body member 12 has a wall section 32 which is perforated at 34 and provided with a packing 36 for the reception of a hollow piston rod 38 which is attached to the ring element 22 by cap screws 40. Also formed in the body 12 is a second cylindrical chamber 42 which is closed by an end plate 44 secured to the body by cap screws 46. The plate 44 has a central tubular extension 48 which passes through a central opening 50 in a piston 52. The fit of the opening 50 on extension 48 is a free one so that the left side of piston 52 is vented to atmosphere.

The piston 52 is slideable in the chamber 42 and has a packing 54 for sealing fluid pressure. It is secured to the piston rod 38 by cap screws 56. The piston rod 38 is bored out to freely receive the tubular extension 48 which also passes through the center of the ring element 22.

Secured to the right hand end face of the body 12 is a nose piece 58 which has a bore 60 registering with the interior of the tubular extension 48. The nose piece 58 is provided with a plurality of radial channels 62 which serve as jaw-guiding surfaces. The latter are closed by a ring 64 secured to the nose piece 58 by cap screws 66.

Figure 7:
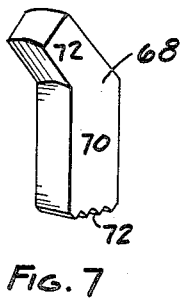
Fig. 7 is a perspective view of a chuck jaw.
Figures 8, 9, 10, 11, 12:

Slideably positioned within the channels 62 and the recesses 24 are a plurality of the chuck jaws 68 which are of angular conformation. Thus, the radial leg 70 of each jaw is positioned within one of the channels 62 of the nose piece 58, while the other leg 72 is slideably positioned in one of the recesses 24. The radially inner ends of the jaw 68 project into the bore 60 and may be custom machined as indicated at 74 to fit any particular form of work piece which is desired. Thus, in the form shown in Fig. 1, the jaws are provided with threads at 74 for holding a threaded work piece (see Fig. 7). Alternatively, the jaws may be formed with a straight gear tooth as shown in Fig. 8 for holding a splined work piece or a gear. The jaw in Fig. 9 has been machined with a helical tooth for holding a correspondingly splined piece. Fig. 10 illustrates the machining of a jaw to receive a tapered spline. Fig. 11 illustrates a jaw machined to receive a part having a tapered thread while Fig. 12 illustrates a jaw machined for holding a plain cylindrical surface of a work piece.

For the purpose of shifting the actuator 20 by means of fluid pressure, there is provided a pair of fluid conduits 76 and 78 (see Fig. 2), one of which leads to the chamber at the left on the side of the wall 32, and the other of which leads to the chamber at the right on the side of the wall 32. As will be readily apparent, admission of fluid pressure through conduit 76 while conduit 78 is connected to exhaust, will cause the piston 52 to shift to the left, bringing the parts into the position shown in Fig. 1. Conversely, reversal of the pressure connection will cause opposite shifting of the actuator rod 20.

In operation, the parts are shown in Fig. 3 with the chuck jaws retracted radially outward, that is, upward in Fig. 3. Fluid pressure admitted through conduit 78 to the right hand side of wall 32 serves to shift actuator 20 into the right hand or disengaged position there shown. The jaw-guiding channels 24 on the ring 22 serve through this rightward movement to cam the jaws 70 outward into their released position.

If there is a work piece in the chuck, it may be removed and a new work piece inserted, after which fluid pressure is applied through the conduit 76 and conduit 78 is connected to exhaust. This shifts the piston 52 and actuator 20 back to the position shown in Fig. 1. In so moving, the ring member 26 acts on the inclined legs 72 of the jaws 68 to cam the latter radially inward into engagement with the work piece shown in dashed lines in Fig. 1 at 80. Fluid pressure being retained in conduit 76, the work is clamped tightly while any desired operations may be performed upon it. Thereafter, the part may be released in the manner previously described.

If it is desired to utilize the chuck for holding a series of work pieces of different sizes or shapes, a new set of chuck jaws is substituted. This may be readily accomplished by removing the nose piece 58, which is held on the body 12 by cap screws 82. As the nose piece is moved outwardly to the right, the jaws 70 are cammed inwardly until the ends of the legs 72 clear the inner diameter of ring 26. Thereafter, the nose piece is completely removed and the jaws 68 may be individually replaced with jaws having different work engaging contour. The nose piece with this new set of jaws is then reassembled onto body 12 with each of the legs 72 again engaged in a jaw-guiding recess 24. After securing cap screws 82, the chuck is again ready for use with parts conforming to the contour of the new set of jaws.

It will thus be seen that the present invention provides an improved radial jaw chuck, in which custom machined jaws may be utilized and wherein the jaws may be readily replaced without requiring a major disassembling operation. It will also be noted that the chuck is readily adapted to fluid pressure operation, especially in view of the combined functions accomplished by the actuator which serves not only as a jaw camming device but also as a fluid operated piston.

While the form of embodiment of the invention as herein described constitutes a preferred form, it is to be understood that other forms might be adopted, all coming within the scope of the claims which follow.

What is claimed is as follows:

1. A work holding chuck comprising a main body member having a cylindrical chamber, an annular actuating member shiftable longitudinally in the chamber of the body member and having a plurality of jaw-guiding recesses extending along equally-spaced elements of an imaginary cone, an annular nose-piece removably secured to the body member, said nose-piece having an annular, axially inwardly extending flange provided with a plurality of radially extending jaw-guiding recesses therethrough, a plurality of work-holding jaws each having a first straight section slideably engageable with and removable from the recesses in the actuating member and a second straight section slideably engageable with and removable from the recesses in the nose-piece and angularly related to the first straight section, and means for shifting the actuating member in the body to cause the conically arranged recesses to guide the jaws radially into and out of engagement with a work-piece, said jaws being disengageable from the guiding recesses in the actuator by removing the nose-piece and jaws as a unit while the actuating member is positioned in the chamber, whereby the jaws may be readily replaced.

2. A work-holding chuck comprising a main body member, an annular actuating member shiftable longitudinally in the body member and having a plurality of jaw-guiding recesses extending along equally-spaced elements of an imaginary cone, an annular nose-piece removably secured to the body member and having a plurality of radially extending jaw-guiding recesses and also having a central longitudinal bore through the walls of which the radial recesses extend, a plurality of work-holding jaws each having a first straight section slideably engageable with and removable from the recesses in the actuating member and a second straight section slideably engageable with and removable from the recesses in the nose-piece and angularly related to the first straight section, the second straight sections of said jaws extending through the recesses in the nose-piece and into said bore, and means for shifting the actuating member in the body to cause the conically arranged recesses to guide the jaws radially into and out of engagement with a work-piece, positioned in the bore, said jaws being disengageable from the guiding recesses in the actuator by removing the nose-piece and jaws as a unit, whereby the jaws may be readily replaced.

3. A work-holding chuck comprising a main body member having a cylindrical chamber, an annular actuating member shiftable longitudinally in the chamber of the body member and having a plurality of jaw-guiding recesses extending along equally-spaced elements of an imaginary cone, an annular nose-piece removably secured to the body member, said nose-piece having a central annular wall defining a bore, said wall having a plurality of radially extending jaw-guiding recesses therethrough, a plurality of work-holding jaws each having a first straight section slideably engageable with and removable from the recesses in the actuating member and a second straight section slideably engageable with, extending through and removable from the recesses in the nose-piece and angularly related to the first straight section, and means forming a second cylindrical chamber in the body separated from the first cylindrical chamber by a perforated wall, a piston in the second chamber, a piston rod extending through the perforated wall and connecting the piston to the actuator, said actuator defining a piston in the first chamber, and means for admitting fluid pressure to each chamber at the end adjacent to the perforated wall whereby the actuator may be shifted to open or close the jaws upon a work-piece.

References Cited in the file of this patent

UNITED STATES PATENTS

| | | |
|---|---|---|
| 693,557 | Maines | Feb. 18, 1902 |
| 2,736,563 | Work | Feb. 28, 1956 |
| 2,784,002 | Stace et al. | Mar. 5, 1957 |